US012786648B2

(12) United States Patent
Berg et al.

(10) Patent No.: US 12,786,648 B2
(45) Date of Patent: Nov. 3, 2026

(54) SYSTEM AND METHOD FOR DAISY CHAIN ADDRESSING IN A SPEAKER SYSTEM

(71) Applicant: Axis AB, Lund (SE)

(72) Inventors: Håkan Berg, Lund (SE); Mattias Nylander, Lund (SE); Jonathan Toft, Lund (SE); Marcus Sandell, Lund (SE)

(73) Assignee: AXIS AB, Lund (SE)

( * ) Notice: Subject to any disclaimer, the term of this patent is extended or adjusted under 35 U.S.C. 154(b) by 130 days.

(21) Appl. No.: 19/044,802

(22) Filed: Feb. 4, 2025

(65) Prior Publication Data

US 2025/0301272 A1 Sep. 25, 2025

(30) Foreign Application Priority Data

Mar. 22, 2024 (EP) .................................... 24165587

(51) Int. Cl.
*H04R 29/00* (2006.01)

(52) U.S. Cl.
CPC .................................. *H04R 29/002* (2013.01)

(58) Field of Classification Search
CPC ............................... H04R 29/002; H04M 1/78
USPC ........................................................... 381/58
See application file for complete search history.

(56) References Cited

U.S. PATENT DOCUMENTS 5,119,014 A 6/1992 Kronberg
9,953,516 B2 4/2018 Warren et al.
10,014,873 B1 * 7/2018 van Veldhoven ..... H03M 1/785
10,447,550 B2 10/2019 van der Wel et al.
11,316,711 B2 4/2022 Vivar et al.
2009/0003613 A1 1/2009 Christensen
2017/0070195 A1 3/2017 Arknaes-Pedersen
2019/0222933 A1 * 7/2019 Lancaster ................ H04R 5/02
2019/0356986 A1 * 11/2019 Wiersum ................ H01F 19/02
2022/0116276 A1 4/2022 Wendt et al.

FOREIGN PATENT DOCUMENTS

EP 2007077 A1 12/2008

OTHER PUBLICATIONS

Extended European Search Report, European Patent Application No. 24165587.7, dated Sep. 24, 2024.

* cited by examiner

*Primary Examiner* — Jirapon Tulop
(74) *Attorney, Agent, or Firm* — Volpe Koenig

(57) ABSTRACT

A speaker system comprises a main unit and passive units connected by control voltage signal, reference voltage signal and audio signal connections to form a daisy chain. The main unit generates a control voltage through the control voltage signal connection; a reference voltage through the reference voltage signal connection; and an audio signal through the audio signal connection. The system further comprises a voltage regulation unit between passive units on the reference voltage signal connection; each voltage regulation unit providing a local reference voltage to each passive unit, wherein the local reference voltages to the passive units gradually increase or decrease between subsequent passive units along the daisy chain. Each passive unit comprises: a speaker; a comparator unit for comparing the control voltage to first and second voltage thresholds from the local reference voltage to generate an audio enable signal enabling the speaker unit to play the audio signal.

15 Claims, 5 Drawing Sheets

SYSTEM AND METHOD FOR DAISY CHAIN ADDRESSING IN A SPEAKER SYSTEM

TECHNICAL FIELD

The present disclosure relates to a speaker system with built-in arrangement for self-testing and to a method for testing the speaker system.

BACKGROUND

In electronics, a daisy chain refers to the practice of connecting devices or components in series, one after another, using a single line or connection. This is often seen in, for example, power supply configurations, where multiple devices are powered in sequence from a single source. Each device in the chain is serially connected to the previous and next devices, forming a chain-like structure.

Daisy chains are generally used in many different fields, such as data communications, control systems, LED lighting systems, or audio systems. Specifically, in passive speaker systems, multiple speakers can be connected in series. Some systems require a plurality of speakers in order to diffuse an identic sound or the same information at different locations, while covering a large area.

An efficient strategy for arranging a network comprising a plurality of speakers throughout a room or a relatively large area involves connecting one main unit to the network and supplying power and audio signals to a daisy chain of passive speakers. This approach can minimize the total length or quantity of cable used in the network. Common cabling solutions in speaker systems may involve the use of, for example Ethernet cables, which are, generally, a cost-efficient choice in network-connected speaker systems.

While the above described system is simple and cost-efficient as such, individual testing of the speakers may be more challenging. Ideally, the passive speakers in the daisy chain of passive speakers shall be as simple as possible in order to keep the bill of material at a minimum. However keeping the passive speaker as simple as possible may have consequences for the implementation of individual testing of the speakers. If, for example, there are no local processing units in the passive speakers to control and/or execute tests, the individual testing becomes very challenging.

US 2019/356986 A1 discloses an impedance matching device, which includes a transformer having an input side and an output side, wherein the input side includes a first coil having a first impedance, a second coil having a second impedance, and a third coil having a third impedance. An input power connector is electrically connected to the input side of the transformer, and a pass through output power connector is electrically connected to the input side of the transformer, and the pass through output connector also is electrically connected in parallel to the input power connector. A speaker output connector having four electrical contacts is included, wherein a first pair of the four electrical contacts is connected electrically to the first coil, and a second pair of the four electrical contacts is connected electrically to the second coil.

SUMMARY

The present disclosure relates to a speaker system with built-in arrangement for self-testing and to a method for testing the speaker system. The disclosed system and method addresses the challenge of testing the speakers individually by an arrangement in which each of a number of connected passive speakers can be individually enabled using a control voltage signal connection and a reference voltage signal connection.

The speaker system comprises a main unit and plurality of passive units, wherein the main unit and plurality of passive units are connected by at least a control voltage signal connection, a reference voltage signal connection and an audio signal connection to form a daisy chain. The speaker system comprises a main unit and plurality of passive units, the speaker system being configured for testing the plurality of passive units individually, wherein the main unit and plurality of passive units are connected by at least a control voltage signal connection, a reference voltage signal connection and an audio signal connection to form a daisy chain,

- the main unit being configured to generate:
  - a control voltage to the plurality of passive units through the control voltage signal connection;
  - a reference voltage to the plurality of passive units through the reference voltage signal connection; and
  - an audio signal to the plurality of passive units through the audio signal connection,
- the speaker system further comprising a voltage regulation unit between each of the plurality of passive units on the reference voltage signal connection, wherein each voltage regulation unit is adapted to provide a local reference voltage to each passive unit, wherein the local reference voltages to the plurality of passive units gradually increase or decrease between subsequent passive units along the daisy chain,
- each of the plurality of passive unit comprising:
  - a speaker unit;
  - a comparator unit configured to compare the control voltage to a first voltage threshold and a second voltage threshold generated from the local reference voltage to generate an audio enable signal enabling the speaker unit to play the audio signal when the control voltage is between the first voltage threshold and the second voltage threshold,
- wherein the main unit receives feedback from each passive unit.

The term 'daisy chain' shall be construed broadly to cover a configuration in which cables are connected from the main unit to the passive units by one or more general connections or cables, but wherein the passive units may have local parallel branches from the one or more general connections or cables. Technically this means that the daisy chain may include parallel components. FIGS. 1 and 2 can be referred to illustrate the concept and the term in this regard. In FIG. 1 the main unit 101 and a plurality of passive units 102 form a daisy chain. The audio signal connection 103 connects the main unit 101 and the plurality of passive units 102 in a daisy chain. However, in FIG. 2 it can be seen that the audio signal connection 112 may have parallel connections to all passive units 102. The term 'daisy chain' shall be construed broadly to cover such configurations. The main unit being configured to generate: a control voltage to the plurality of passive units through the control voltage signal connection; a reference voltage to the plurality of passive units through the reference voltage signal connection; and an audio signal to the plurality of passive units through the audio signal connection, the speaker system further comprising a voltage regulation unit, which may be one or more resistors, between each of the plurality of passive units on the reference voltage signal connection, wherein each voltage regulation unit is adapted to provide a local reference voltage to each passive unit, wherein the local reference voltages to the plurality of passive units gradually increase or decrease between subsequent passive units along the daisy chain, each of the plurality of passive unit comprising: a speaker unit; a comparator unit configured to compare the control voltage to a first voltage threshold and a second voltage threshold generated from the local reference voltage to generate an audio enable signal enabling the speaker unit to play the audio signal when the control voltage is between the first voltage threshold and the second voltage threshold.

Each of the plurality of passive units may comprise a comparator unit configured to compare the control voltage to a first voltage threshold and a second voltage threshold generated from the local reference voltage. By having a reference voltage that increases or decreases along the chain of passive units, each of the passive units will have its own local reference voltage. The local reference voltages and the control voltages can be used for individually enabling of the speaker units in the passive units. An audio enable signal can be enabled in each of the plurality of passive units by using two connections, i.e., the control voltage signal connection and the reference voltage signal connection. The number of connections for the generation of the audio enable signal in the passive units, in the above case two connections or two signals, can be independent of the number of plurality of passive units, which can be at least two, preferably at least five, more preferably at least ten, or even more preferably at least twenty passive units.

By using the presently disclosed speaker system, certain expensive and/or complex components, such as processing units, can be excluded from the passive speakers while maintaining the possibility of testing the speakers individually. Advantageously, the main unit can handle most of the functionalities, where the functionalities can be provided to the plurality of passive units merely by use of a control voltage signal connection, a reference voltage signal connection and an audio signal connection.

The present disclosure further relates to a method of testing a speaker system comprising a main unit and plurality of passive units, wherein the main unit and plurality of passive units are connected by at least a control voltage signal connection, a reference voltage signal connection and an audio signal connection to form a daisy chain, the method comprising: generating a reference voltage on the reference voltage signal connection, wherein the reference voltage gradually increases or decreases between subsequent passive units along the daisy chain, thereby providing a local reference voltage to each passive unit; providing a control voltage on the control voltage signal connection; generating an audio signal to the plurality of passive units through the audio signal connection; in each passive unit, comparing the control voltage to a first voltage threshold and a second voltage threshold generated from the local reference voltage to generate an audio enable signal enabling a speaker unit in the passive unit to play the audio signal when the control voltage is between the first voltage threshold and the second voltage threshold; receiving a feedback from each passive unit, thereby testing each passive unit.

The method may provide a testing method for a speaker system, wherein the speaker system comprises a main unit and a plurality of passive units. One reference voltage and one control voltage can allow the speaker system to individually enable a speaker in each of the plurality of passive units, where the reference voltage can be used to generate a local reference voltage to each passive unit. An audio signal can be played in the speaker, thereby testing each of the plurality of passive units. The audio signal played by the speaker can be recorded by the main unit through a microphone. An alternative test can be performed by measuring or monitoring a supply current derived from a supply voltage, wherein the supply voltage is provided by the main unit to the plurality of passive units. As soon as an audio signal is played in a speaker of one of the plurality of passive units, a supply current can be monitored through the supply voltage connection, thereby testing the speaker of one of the plurality of passive units.

The speaker system may be configured such as only one passive unit plays the audio signal at a time. This can be used to test if the specific speaker units are functional. This can be achieved with the method as described herein, where the main unit can provide a swept control voltage via the control voltage connection which will address a specific passive unit connected in the daisy chain, by comparing the control voltage to the first and the second voltage threshold.

By having a gradually increasing or decreasing reference voltage, each of the passive units will be provided with a local reference voltage. The main unit can provide a control voltage via the control voltage signal connection, such as a pulse width modulated (PWM) control voltage signal, which can be configured such that a specific passive unit in the daisy chain can be enabled or disabled.

DESCRIPTION OF THE DRAWINGS

Various embodiments are described hereinafter with reference to the drawings. The drawings are non-limiting examples of embodiments and are intended to illustrate some of the features of the presently disclosed speaker system and method of testing a speaker system.

DETAILED DESCRIPTION

The present disclosure relates to a speaker system comprising a main unit and a plurality of passive units, wherein the main unit and plurality of passive units are connected by at least a control voltage signal connection, a reference voltage signal connection and an audio signal connection, the main unit being configured to generate: a control voltage through the control voltage signal connection; a reference voltage through the reference voltage signal connection; and an audio signal through the audio signal connection, the speaker system further comprising a voltage regulation unit between each of the plurality of passive units on the reference voltage signal connection, wherein each voltage regulation unit is adapted to provide a local reference voltage to each passive unit, wherein the local reference voltages to the plurality of passive units increase or decrease between subsequent passive units, each of the plurality of passive unit comprising: a speaker; a comparator configured to compare the control voltage to a first voltage threshold and a second voltage threshold generated from the local reference voltage to generate an audio enable signal enabling the speaker to play the audio signal when the control voltage is between the first voltage threshold and the second voltage threshold.

Figure 1:
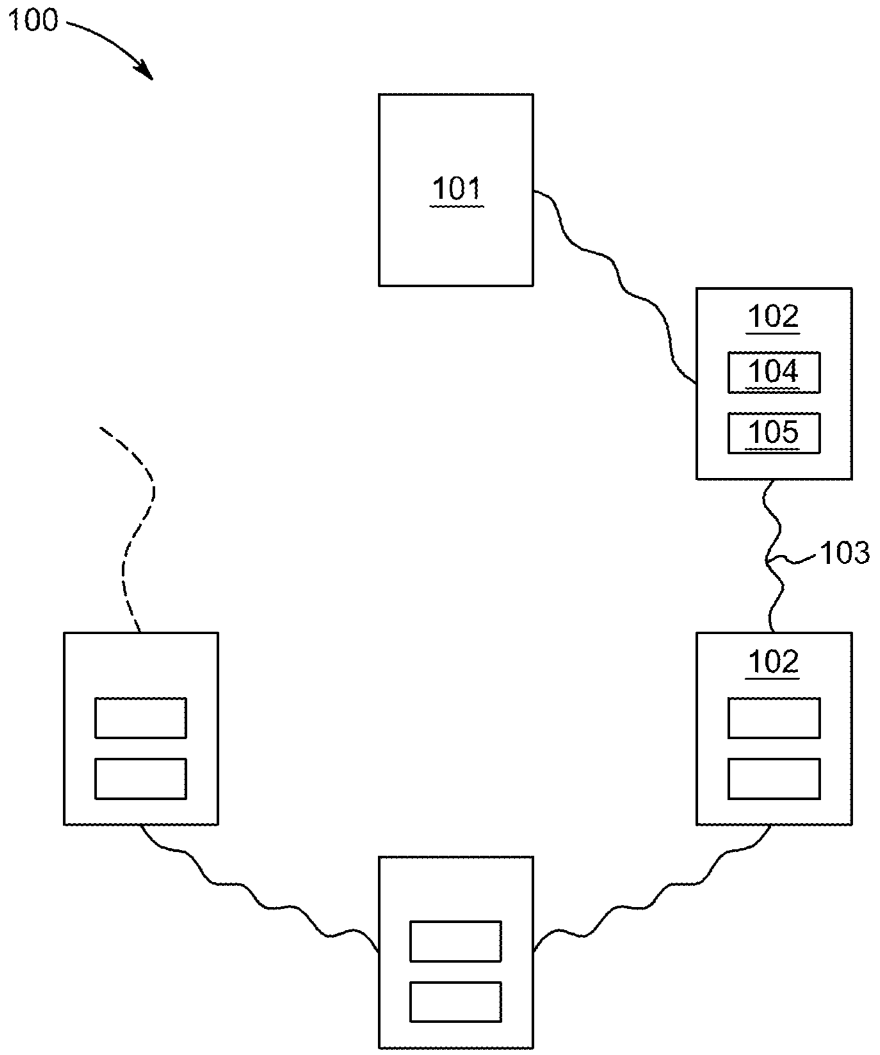
FIG. 1 shows a schematic view of an embodiment of the speaker system as disclosed herein.

FIG. 1 shows a schematic view of an embodiment of the speaker system 100. The speaker system 100 comprises a main unit 101 and a plurality of passive units 102, connected by at least a control voltage signal connection, a reference voltage signal connection and an audio signal connection 103 to form a daisy chain. Each passive unit 102 comprises a speaker unit 104 and a comparator unit 105. FIG. 1 shows a main unit 101 and four passive units 102. More passive units may be connected after the fourth passive unit. All passive units comprise a speaker unit 104 and a comparator unit 105. By connecting the main unit and the passive units in a daisy chain arrangement, a reduced complexity of the speaker system is achieved. Using a daisy chain configuration may be cost-effective as it may require less cabling and may reduce the need for additional equipment. It can be noted that the term 'daisy chain' may be construed broadly to cover a configuration in which cables are connected from the main unit to the passive units by one or more general connections or cables, but wherein the passive units have local parallel branches from the one or more general connections or cables. Technically this means that the daisy chain may include parallel components. Adding more passive units can be easier since a user can easily connect at least one additional passive unit to the existing chain without significant modifications. By having a main unit, a centralized control can be achieved.

In one embodiment, the voltage regulation unit comprises a resistor. The resistor can be a fixed resistor, a variable resistor, such as a rheostat or a potentiometer and/or a specialized resistor, such as a thermistor or a varistor. Preferably, a fixed resistor may be used to keep the system simple while limiting the cost of any other alternative which may be more expensive. The voltage regulation unit may comprise a voltage drop device configured to generate a voltage drop. The voltage drop device can be a diode, such as a Zener diode, a LED, a transistor configured to generate a voltage drop, such as a NMOS device or a PMOS device, or any other suitable element or component for creating a voltage drop. Bipolar junction transistors may also be used according to the same principle, where the collector junction is short circuited with the base junction, in the case of a NPN. Inductors may also have a series resistance, that can be used to create a voltage drop, thereby inductors can also be used as a voltage drop device. Interconnections, such as cables and/or copper traces, may have a series resistance. In this case, interconnections that may connect the main unit with the plurality of passive units may also be used to generate a voltage drop.

Alternatively, the speaker system may be designed such that the reference voltage increases along the chain of passive units. This can be achieved by having a higher voltage at the end of the chain and a voltage drop in the reverse direction of the chain. Theoretically the voltage regulation unit may even comprise a voltage increase unit. A voltage increase unit may comprise a DC-DC converter, such as a boost converter, and/or a charge pump, such as a switched-capacitor DC-DC converter.

In a preferred embodiment, the voltage regulation unit comprises a resistor. The resistor may have a resistance between 1 k and 1M ohms, such as between 1 k and 500 k ohms, or between 1 k and 100 k ohms, or between 1 k and 80 k ohms, or between 1 k and 50 k ohms, or between 1 k and 40 k ohms, or between 1 k and 30 k ohms, or between 1 k and 20 k ohms, or between 1 k and 10 k ohms, or between 1 k and 5 k ohms, or between 1 k and 2 k ohms. A typical value of a resistor that is useful for the purpose is 10 k ohms. A high resistance value may cause a high voltage drop, which may render the speaker system more difficult to use. A low resistance value may cause a low voltage drop. A compromise may be found, taking into account the general impedance of the different nodes in the speaker system. Some nodes may have a low impedance, or a high impedance, and the value of the resistance may be chosen accordingly such that the current leakage through the nodes is kept to a minimum, while allowing a relatively large voltage drop between each of the plurality of passive units.

The speaker system can comprise at least two, or at least five, or at least ten, or even at least twenty passive units. Each of the passive units can be connected to form a daisy chain. A daisy chain can refer to a wiring or connectivity configuration where devices are connected in series, one after the other, preferably in a linear fashion. This term may be used to describe a method of interconnecting devices or components in a way that forms a chain-like structure. In the present disclosure, the main unit and the plurality of passive units can be connected to form a daisy chain. All connections such as a control voltage signal connection, a reference voltage signal connection and an audio signal connection can be comprised in an interconnection cable, wherein the interconnection cable is used to interconnect or connect the main unit and the plurality of passive units.

In one embodiment, the first voltage threshold and/or the second voltage threshold is between 0 V and the local reference voltage. The first voltage threshold and/or the second voltage threshold may be generated from the local reference voltage. The first voltage threshold and/or the second voltage threshold can be generated by applying a voltage transformation to the local reference voltage, where the voltage transformation may be a voltage drop or a voltage increase.

In one embodiment, the plurality of passive units comprise a first and a second voltage threshold generator. The first and the second voltage threshold generator can be configured to generate the first and the second voltage threshold. Preferably, the first and the second voltage threshold generator may be configured to generate the first and the second voltage threshold from the local reference voltage. The local reference voltage may be an input of the first and the second voltage threshold generator. The first and the second voltage threshold generator can comprise at least one passive device and/or at least one active device.

Each passive unit can be configured to generate the first voltage threshold and/or the second voltage threshold by voltage division. A voltage division may be performed with a voltage divider. A voltage division, which would generally be known by a person skilled in the art, is a common technique used in electronics to distribute a voltage across multiple resistors, preferably in a series circuit, with a voltage divider.

In a preferred embodiment, the voltage divider comprises two voltage divider resistors, and the two voltage divider resistors are arranged in series between the local reference voltage and the ground. Each of the two voltage divider resistors may have a voltage divider resistance, wherein the voltage divider resistance can be selected such that the voltage division gives a useful first or second voltage threshold. The first voltage threshold may be lower than the second voltage threshold, but in principle the opposite works as well. By using a voltage divider with two voltage divider resistors, a cheap and simple solution to generate the first and/or the second voltage threshold from the local reference voltage can be achieved. As described earlier, a low voltage divider resistance value may cause an unnecessary current leakage from the local reference voltage and the ground, and a voltage divider resistance value that is too high may cause a low voltage drop between each of the plurality of passive units, for a given resistance value of the resistor comprised in the voltage regulation unit. In order to avoid having to decide on a compromise, an impedance buffer can be comprised in the voltage regulation unit. An impedance buffer can be a buffer amplifier. Buffer amplifiers may be used to provide a high input impedance and a low input impedance. Thereby, they can isolate or decouple one part of a circuit from another, preventing loading effects. Some common types of impedance buffers can include:

Operational Amplifier (Op-Amp) Buffers: Using operational amplifiers configured in a voltage follower (unity gain) mode creates a buffer with high input impedance and low output impedance.

Emitter Follower Buffer: A transistor configured as an emitter follower provides a buffer with low output impedance and unity voltage gain.

Source Follower Buffer: A transistor configured as a source follower (common drain) provides a buffer with low output impedance and unity voltage gain.

Voltage Follower Buffer: A simple voltage follower circuit using a unity gain amplifier, such as an op-amp, acts as an impedance buffer.

FET (Field-Effect Transistor) Buffer: A FET configured as a source follower can act as a buffer, providing low output impedance.

Transformer-Based Buffer: Transformers can be used to create impedance buffers, especially in audio applications. The primary and secondary windings provide isolation and impedance matching.

The comparator unit can comprise at least two comparators, wherein a first comparator may be configured to compare the first voltage threshold to the control voltage and a second comparator is configured to compare the second voltage threshold to the control voltage. By having two comparators comparing the first voltage threshold and the second voltage threshold with the control voltage, a voltage window can be defined, thereby identifying a voltage range where the control voltage can be higher than the first voltage threshold and lower than the second voltage threshold, and vice versa if the second voltage threshold is lower than the first voltage threshold.

The first comparator can generate a first comparator digital output and the second comparator may generate a second comparator digital output. The first and the second comparator digital output can then be used to define a voltage range, as described earlier, wherein digital outputs can be further used in a digital circuit.

The first comparator digital output and the second comparator digital output can be inputs to a logic gate. By having the first and the second comparator digital output as inputs to a logic gate, a digital decision can be made by the logic gate, where the decision is taken depending on the outputs of the two comparators. The digital decision may be true if the control voltage is between the first and the second voltage threshold and false if the control voltage is not between the first and the second voltage threshold.

In one embodiment, the logic gate is configured to output the audio enable signal depending on the inputs. The audio enable signal may depend on the digital decision as described in the previous paragraph. The digital decision may depend on the inputs. The audio enable signal may be used to activate an amplifier, which may use an audio signal to be played on a speaker.

The logic gate can be an XOR or an AND gate. The logic gate may be chosen such that an accurate digital decision is obtained as an output of the logic gate. An AND gate can be accurate if the control voltage is between the first and the second voltage threshold when both comparators outputs a high digital output. An XOR gate can be accurate if the control voltage is between the first and the second voltage threshold when one comparator outputs a high digital output while the other comparator outputs a low digital output.

Figure 2:
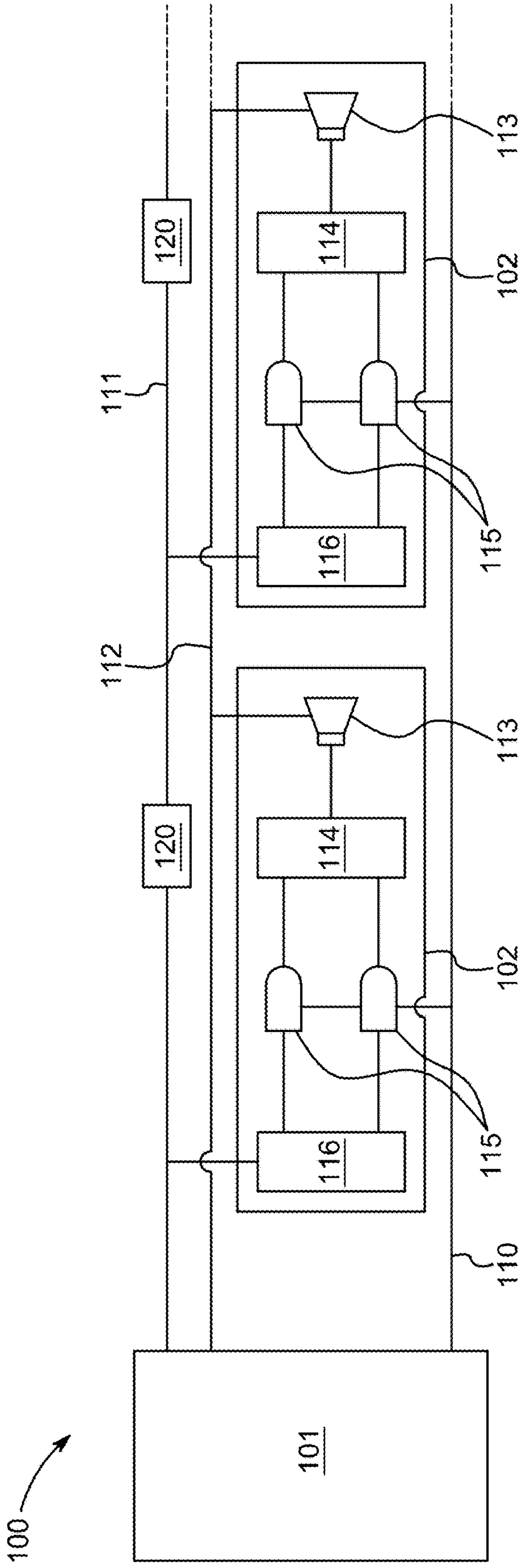
FIG. 2 shows a schematic view of an embodiment of the speaker system as disclosed herein, where a schematic view of the plurality of passive units is illustrated.

FIG. 2 shows a schematic view of an embodiment of the speaker system 100 as disclosed herein, where a schematic view of the plurality of passive units 102 is illustrated. Each of the plurality of passive units comprises a first and a second voltage threshold generator 116, two comparators 115, a logic gate 114 and a speaker 113. The speaker may be the speaker unit as described herein. The speaker unit may comprise a speaker amplifier and/or any other auxiliary devices or systems that can be used in conjunction with a speaker, or a sound emitting device. The main unit is configured to generate a control voltage to the plurality of passive units through the control voltage connection 110, an audio signal to the plurality of passive units through the audio signal connection 112 and a reference voltage to the plurality of passive units through the reference voltage connection 111. A voltage regulation unit 120 is arranged between each of the plurality of passive units on the reference voltage signal connection 111. The voltage regulation unit 120 is adapted to provide a local reference voltage to each passive unit. There may be a voltage difference across the voltage regulation unit 120. Thereby, the reference voltage decreases or increases along the reference voltage signal connection along the chain of passive units 120. The user may configure the voltage regulation unit such that the reference voltage gradually increases or decreases between subsequent passive units along the daisy chain. By gradually increasing or decreasing the reference voltage, at least one local reference voltage can be generated, thereby generating a unique local reference voltage for each of the plurality of passive units. The speaker 113 receives the audio signal from the audio signal connection 112. The first and second voltage threshold generator 116 is configured to generate a first and a second voltage threshold from the local reference voltage provided by the reference voltage signal connection 111. Each passive units has a unique local reference voltage, thereby unique first and second voltage thresholds. Two comparators 115 are arranged in the plurality of passive units, wherein the comparators are configured to compare the first and the second voltage threshold to the control voltage, wherein the control voltage is provided by the control voltage signal connection 110. The first comparator generates a first comparator digital output and the second comparator generates a second comparator digital output. The first and the second comparator digital output are processed in a logic gate, and the logic gate outputs the audio enable signal, which enables the speaker 113. Preferably, the logic gate is selected such as the audio enable signal is activated or at a logic high level when the control voltage is comprised between the first and the second threshold signal. A logic high level or logic high state may represent a binary value of 1 in the binary system, indicating a high digital voltage level or a logical true condition. A logic high level or a logic low level describes the binary states used in digital electronics, where high and low voltages correspond to logical 1 and 0, respectively. By enabling the speaker 113, the audio signal provided by the audio signal connection 112 can then be played by the speaker 113, thereby being heard by a user, or by an audio capturing device. The audio capturing device can either be comprised in the passive units, in the main unit, or in a secondary system, preferably at a distance of the speaker where sounds emitted by the speaker can be captured.

Figure 3:
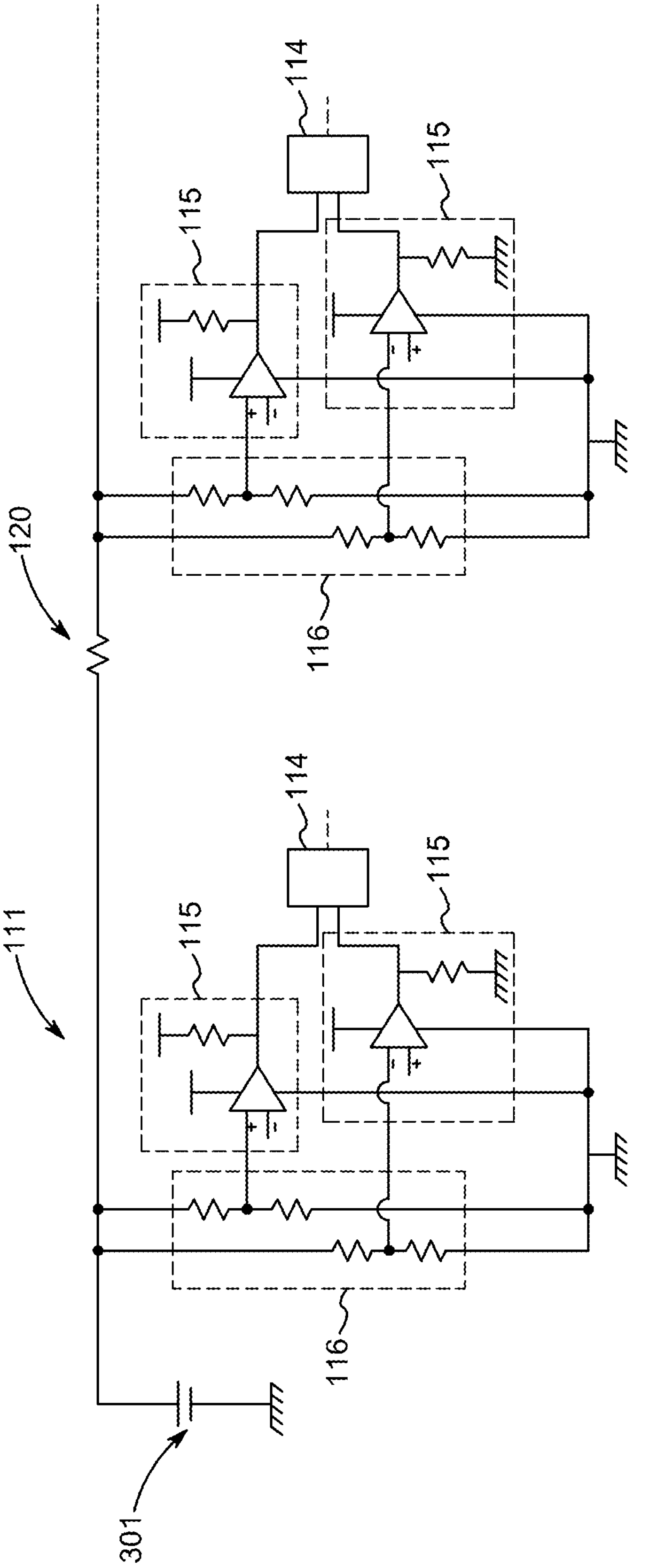
FIG. 3 shows a schematic view of an embodiment of the plurality of passive units, where electrical connections are illustrated.

FIG. 3 shows a schematic view of an embodiment of the plurality of passive units, where electrical schematics are illustrated. In this example each of the passive units comprises a first and a second voltage threshold generator 116, where the first and the second voltage threshold are generated with a voltage divider, wherein each of the voltage divider comprises two resistors. The resistance value of the two resistors are selected such that the first and the second voltage thresholds are different voltages. The voltage regulation unit 120 is a resistor. By arranging a resistor in the reference voltage signal connection, a voltage drop can be performed between each of the passive units, thereby generating a local reference voltage which is different for each of the plurality of passive units. The voltage drop performed between each of the passive units depends on the resistance value of the resistor and the current flowing into the resistor, from a reference voltage generator 301. The current flowing into the resistor depends on the resistance value of the resistor in combination with the resistors arranged in the first and second voltage threshold generator 116. It may be an advantage to determine a sufficient resistance value in order to create a sufficient voltage drop between the local reference voltages, while minimizing the amount of current delivered to the reference voltage signal connection 111. A person skilled in the art would generally know how to determine a ratio that would satisfy a sufficient voltage drop while minimizing the amount of current delivered to the reference voltage signal connection by the reference voltage generator 301. The reference voltage generator 301 may be arranged in the main unit. The first and the second voltage threshold are generated from the local reference voltage, generated from the reference voltage signal connection 111. The first and the second voltage threshold are then compared to the control voltage in the two comparators 115. The input connections of the two comparators is a specific embodiment and the embodiments should not be restricted to this specific embodiment described in FIG. 3. The two comparators output a first and a second comparator digital outputs. A pull up resistor and/or a pull down resistor are arranged on the first and the second comparator digital outputs in order to ensure a known state in the first and the second comparator digital outputs. As described in connection with FIG. 2, the first and the second comparator digital outputs are processed in a logic gate 114, and the logic gate outputs the audio enable signal, which enables the speaker, not illustrated in FIG. 3.

Figure 4:
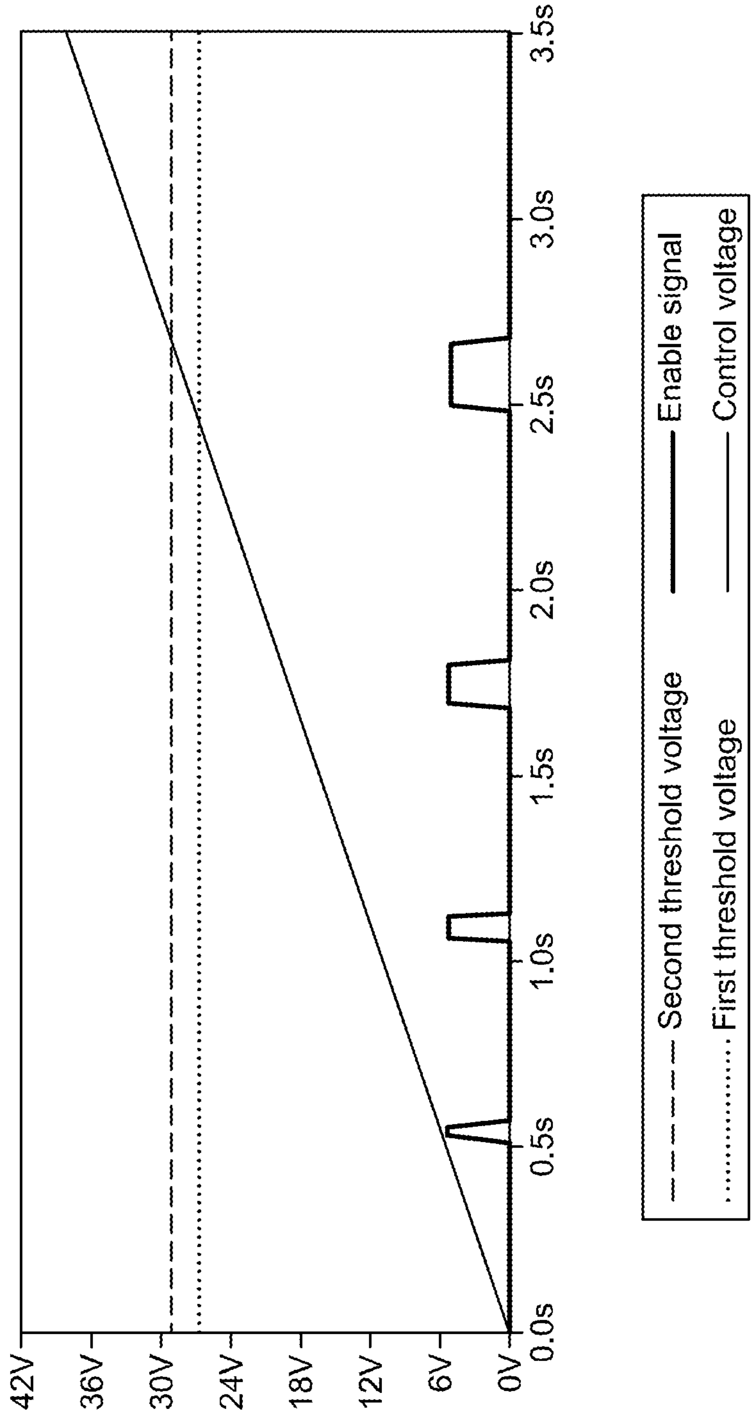
FIG. 4 shows an example of the control voltage being swept from a first level to a second level and the triggering of enable signals in the passive units.

FIG. 4 shows an example of the control voltage being swept from a first level to a second level, where a local enable signal is triggered in each of the four passive units. In this example the first level when the process begins is 0 V and the second level when the process ends is 38 V. The person skilled in the art would appreciate that these two levels can be adjusted to the circumstances and the number of passive units. The first and the second voltage thresholds for one of the passive units are respectively configured to be generated at 27 V and 29 V. The first and the second voltage thresholds as shown in FIG. 4 are generated by one of the passive units. As can be seen in FIG. 4, the local audio enable signal for passive unit is set to a digital logic high when the control voltage is between the first and the second voltage thresholds. As soon as the control voltage crosses the first voltage threshold, the audio enable signal gets a digital logic high, which is in this specific embodiment, 5 V. As soon as the control voltage crosses the second voltage threshold, the audio enable signal gets a digital logic low, which is in this specific embodiment, 0 V. By sweeping the control signal between the first and the second voltage threshold, or preferably by setting the control signal between the first and the second voltage threshold, the audio enable signal can be activated for the specific passive unit having the first and the second voltage threshold, thereby enabling the speaker to play sound provided by the audio signal connection. It can be noted in the diagram in FIG. 4 that an enable signal is activated four times: at 0.5 s, slightly after 1.0 s, between 1.5 s and 2.0 s and finally at 2.5 s. In this illustration the four instances of enabled signals represent four different local enable signals in four different passive units.

The speaker system may further comprise a supply signal connection and/or a ground signal connection.

The main unit may be further configured to generate a supply signal to the plurality of passive signal units through the supply signal connection.

The supply signal can be a supply voltage, and the supply voltage may be comprised between 1.5 and 120 V, such as 1.5 and 96 V, such as 1.5 and 48 V, such as 1.5 and 24 V, such as 1.5 and 12 V, such as 1.5 and 9 V, such as 1.5 and 5 V, such as 1.5 and 3.3 V. The supply voltage may be a standard supply voltage for ethernet cables, such as a supply voltage comprised between 12 V and 57 V, or between 37 V and 57 V.

The main unit may be further configured to generate a ground signal to the plurality of passive signal units through the ground signal connection. The ground signal can be a ground voltage. The ground voltage can be, for example, 0 V. In most practical electronic systems and electronic circuits or systems, the term "ground" may be used as a reference point, and it can conventionally be considered to be at 0 V. A ground can, however, potentially have a positive or a negative voltage. A ground may be referred as a reference point, from which all voltages used in the system can be referred to.

The main unit and the plurality of passive units can be connected by at least five conductors configured to provide at least the supply signal connection, the ground signal connection, the reference signal connection, the audio signal connection and the control signal connection.

The main unit and the plurality of passive units can be connected by at least eight conductors. By having eight conductors, more flexibility can be achieved with the different connections, as described earlier, such as at least a control voltage signal connection, a reference voltage signal connection, an audio signal connection, a supply signal connection and/or a ground signal connection. For instance, two cables can be used for the supply signal connection and/or the ground signal connection.

The at least five conductors or at least eight conductors may be comprised in an ethernet cable. An ethernet cable is a type of cable mainly used to connect devices in a local area network for the purpose of transmitting data. Ethernet cable can also be used for transmitting power. Ethernet cables are defined by standards established by the Institute of Electrical and Electronics Engineers (IEEE). Ethernet cables have connectors at each end, commonly known as RJ45 connectors. This can facilitate and reduce the cost of a system compatible with such technology, since this technology is widely used and available. Ethernet cables can also be used for Power over Ethernet (POE) implementations. The presently disclosed speaker system with built-in arrangement for self-testing may use Ethernet cables for providing power but may operate without involving communication according to the PoE protocol. Power over Ethernet allows electrical power to be transmitted over the same Ethernet cable used for interconnecting devices or units with data communication. The choice of Ethernet cable category can be critical in PoE applications. Higher categories, such as Cat5, Cat5e, Cat6, Cat6a, or Cat7, can often be preferred for their enhanced power delivery capabilities and reduced power loss over longer cable lengths. Ethernet cables, when used in Power over Ethernet applications, can provide a convenient and efficient way to power and connect networked devices, reducing the need for additional power cables and simplifying installations in various environments.

It is possible to use a single conductor to provide the supply signal connection. In one embodiment, at least two conductors are configured to provide the supply signal connection. By having at least two conductors configured to provide the supply signal connection, a supply voltage drop can be reduced. Two parallel conductors can reduce the series resistance of the supply signal connection by a factor of two. More preferably, more than two conductors can also be used in parallel to further reduce the series resistance of the supply signal connection. A compromise may be defined to limit the series resistance of the supply signal connection while minimizing the number of cables used for the supply signal connection.

In another embodiment, at least two conductors are configured to provide the ground signal connection. By having at least two conductors configured to provide the ground signal connection, a supply voltage drop can be reduced. Preferably, two conductors used in parallel can reduce the series resistance of the ground signal connection by a factor of two. More preferably, more than two conductors can also be used in parallel to further reduce the series resistance of the ground signal connection. A compromise may be defined to limit the series resistance of the ground signal connection while minimizing the number of cables used for the ground signal connection. The inventors found out that at least two conductors may be used in order to reduce the series resistance of the ground signal connection to an acceptable level.

The audio signal connection can be a differential audio signal connection. Accordingly, the audio signal may be a differential audio signal. Differential audio signaling can be preferred over single-ended audio signaling in many applications or systems due to several advantages related to noise rejection, common-mode rejection, and overall signal integrity. Differential signaling can help in rejecting common-mode noise. Common-mode noise refers to interference that is present on both the positive and negative signal lines in the same direction. In a differential signal, common-mode noise is canceled out because the receiver responds only to the difference between the two signal lines. This enhances the system's immunity to external noise sources. Common-Mode Rejection Ratio (CMRR) is a measure of how effectively a system rejects common-mode signals. Differential signaling provides a high CMRR, as the common-mode noise is canceled out. This is especially important in environments with high electromagnetic interference (EMI) or radio-frequency interference (RFI). Differential signaling can be more suitable for longer cable runs. In single-ended systems, long cables can act as antennas and pick up additional noise. The noise picked up on both signal lines is common-mode noise, and a differential receiver can reject this noise effectively. Differential signaling can help maintain signal integrity by reducing the impact of external interference and noise. This may be preferable in high-fidelity audio applications where preserving the original signal quality is advantageous. In single-ended systems, ground loops can contribute to noise in the signal. Differential signaling helps minimize the impact of ground loops because the common-mode noise induced on the ground lines is rejected by the differential receiver. Differential signaling may allow for an increased dynamic range in audio systems. It can accommodate a wider range of signal amplitudes without distortion, providing more headroom for the audio signal.

In one embodiment, the audio signal connection is configured to use at least two conductors. By using at least two conductors, a first conductor can provide a positive side of the differential audio signal while a second conductor can provide a negative side of the differential audio signal, thereby providing a differential audio signal.

Figure 5:
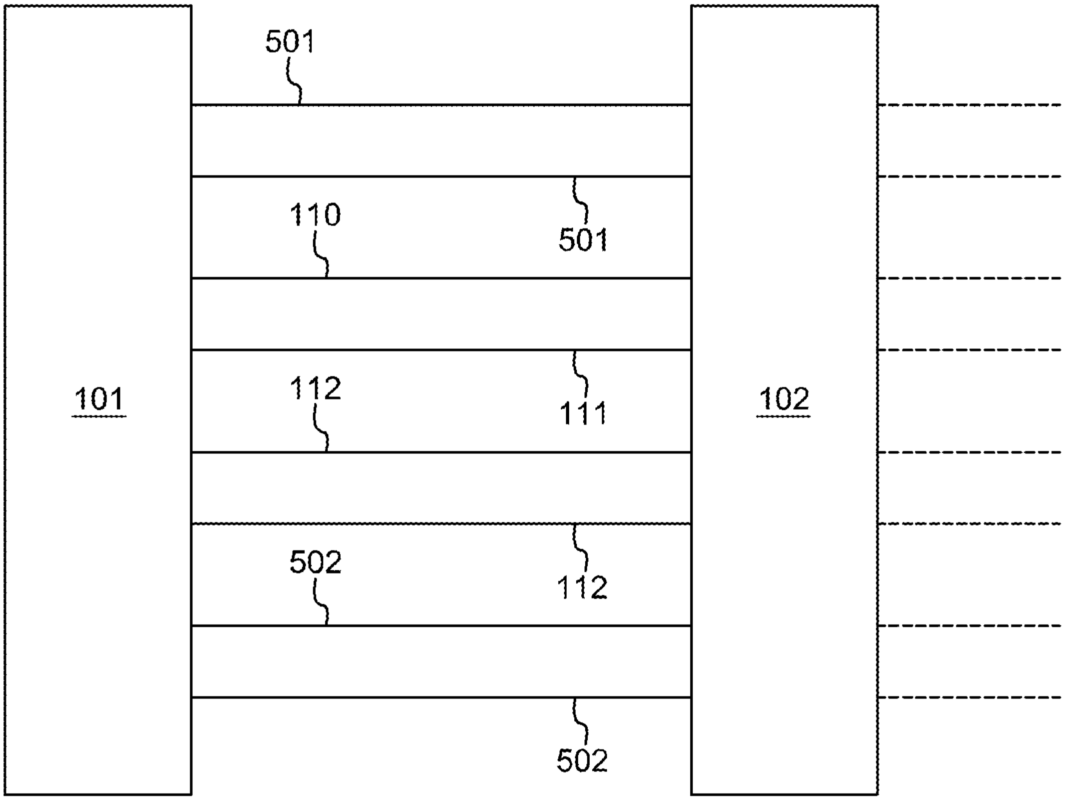
FIG. 5 shows a schematic view of an embodiment of the eight conductors comprised in an ethernet cable serially connecting a main unit with a passive unit.

FIG. 5 shows a schematic view of an embodiment of the eight conductors comprised in an ethernet cable serially connecting a main unit 101 with a passive unit 102. The main unit 101 is serially connected with a passive unit 102, with eight conductors. Two of the eight conductors are configured to provide the supply signal connection 501 and two of the eight conductors are configured to provide the ground signal connection 502. Two of the eight conductors are configured to provide the audio signal connection 112. One of the eight conductor is configured to provide the control voltage signal connection 110 and another one of the eight conductors is configured to provide the reference voltage signal connection 111.

The present disclosure further relates to a method of testing a speaker system which may comprise a main unit and plurality of passive units, wherein the main unit and plurality of passive units are connected by at least a control voltage signal connection, a reference voltage signal connection and an audio signal connection to form a daisy chain, the method may comprise: generating a reference voltage on the reference voltage signal connection, wherein the reference voltage gradually increases or decreases between subsequent passive units along the daisy chain, thereby providing a local reference voltage to each passive unit; providing a control voltage on the control voltage signal connection; generating an audio signal to the plurality of passive units through the audio signal connection; in each passive unit, comparing the control voltage to a first voltage threshold and a second voltage threshold generated from the local reference voltage to generate an audio enable signal enabling a speaker unit in the passive unit to play the audio signal when the control voltage is between the first voltage threshold and the second voltage threshold; receiving a feedback from each passive unit, thereby testing each passive unit.

In one embodiment, the feedback is received by the main unit. The main unit may comprise a secondary system that may be configured to process the feedback. The feedback can be processed by the secondary system such as the information comprised in the feedback can generate an action to be taken by the main unit. Preferably, if the feedback gives an information that one of the plurality of passive units may comprise a failure, such as a non-functional speaker, the main unit can generate a signal informing the user that at least one passive unit of the plurality of passive units may require maintenance or replacement of at least one of the features comprised in the at least one passive unit.

The feedback can be a feedback current. The main unit and the plurality of passive units can be connected by a supply voltage connection. The supply voltage connection may generate a supply voltage. Thereby, the feedback current can be a supply current driven by the supply voltage. Preferably, the main unit may generate power, which can be provided to the plurality of passive units with the supply voltage connection. Advantageously, the supply current can be monitored or registered by the main unit. By monitoring or registering the supply current delivered on the supply voltage connection, a detection of failure on each one of the plurality of passive units can be detected. Advantageously, by generating an audio enable signal enabling a speaker unit in the passive unit to play the audio signal when the control voltage is between the first voltage threshold and the second voltage threshold, a consequent supply current can be measured or monitored by the main unit through the supply voltage connection. If an audio signal is played on the speaker unit and if the speaker unit is functioning as expected, an AC signal should be measured on the supply current, wherein the AC signal mirrors the characteristics of the audio signal. Notably, if the speaker unit is non-functional, a wrong DC supply current may be measured, and specifically, a substantial part of the AC signal would be absent.

The feedback current can be a spike current provoked by an activation of the speaker unit. By activating the speaker unit, a spike current can be monitored that may follow the activation of the speaker unit. This may indicate that the speaker unit is well functioning.

The main unit and/or at least one of the plurality of passive units can comprise at least one microphone. The main unit and/or at least one of the plurality of passive units may comprise at least one audio capturing device. The at least one microphone can be a condenser microphone, a dynamic microphone or a ribbon microphone. A condenser microphone uses a diaphragm and a backplate to form a capacitor. Condenser microphones are known for their sensitivity and ability to capture a wide range of frequencies. A dynamic microphone uses electromagnetic induction to generate an electrical signal. Dynamic microphones are known to be robust, versatile, and may not require external power. A ribbon microphone uses a thin strip of metal suspended in a magnetic field. Ribbon microphones are known for their smooth and natural sound reproduction. A dynamic microphone may represent a good choice since it may not require any external power to generate capture sounds, thereby saving power.

In a preferred embodiment, the feedback is an audio feedback, wherein the audio feedback is the audio signal played by the passive unit and recorded by the at least one microphone. As described herein, by capturing and/or registering the audio feedback, a detection of failure on each one of the plurality of passive units can be detected. The capturing and/or registering of the audio feedback can be performed with at least one microphone, wherein the at least one microphone can be either comprised in the main unit, or in at least one of the plurality of the passive units.

The method may further comprise sweeping the control voltage on the control voltage signal connection from a first voltage level to a second voltage level. By sweeping the control voltage from a first voltage level to a second voltage level on the control voltage signal connection, a test of a plurality of speakers in a plurality of passive units may be performed. Preferably, each of the plurality of passive units may generate a unique first and second voltage threshold. By sweeping the control voltage, a subsequent activation of the speakers of subsequent passive units can be performed. The user may detect the activation of a plurality of speakers while sweeping the control voltage on the control voltage signal connection. The sweep of the control voltage may be a linear voltage sweep or a step voltage sweep. In a linear voltage sweep, the voltage is incremented or decremented linearly over a specified range. In a step voltage sweep, the control voltage is swept in discrete steps. This can be useful for testing the speaker system at specific voltage levels, in order to test specific passive units. Preferably, the linear voltage sweep can have a linear voltage sweep slope. The slope of the linear voltage sweep can be chosen such that a test of the subsequent plurality of passive units can be performed while allowing a sufficient period of time between two subsequent passive units. A too steep linear voltage sweep over time of the control voltage would result in an activation of the speakers of subsequent passive units in a relative short period of time, while not having sufficient time to detect which speaker of which passive units may be enabled. For example, if the speaker system is arranged in an environment with an echo, this would render the audio feedback challenging since two different speakers could be detected as functioning while only the first speaker may be functioning. In other words, a remaining sound of the first speaker of a first passive unit could be detected as a sound being received from an activation of the subsequent speaker of the subsequent passive unit being tested.

The invention claimed is:

1. A speaker system comprising a main unit and plurality of passive units, the speaker system being configured for testing the plurality of passive units individually, wherein the main unit and plurality of passive units are connected by at least a control voltage signal connection, a reference voltage signal connection and an audio signal connection to form a daisy chain, the main unit being configured to generate:
- a control voltage to the plurality of passive units through the control voltage signal connection;
- a reference voltage to the plurality of passive units through the reference voltage signal connection; and
- an audio signal to the plurality of passive units through the audio signal connection, the speaker system further comprising a voltage regulation unit between each of the plurality of passive units on the reference voltage signal connection, wherein each voltage regulation unit is adapted to provide a local reference voltage to each passive unit, wherein the local reference voltages to the plurality of passive units gradually increase or decrease between subsequent passive units along the daisy chain, each of the plurality of passive unit comprising:
- a speaker unit;
- a comparator unit configured to compare the control voltage to a first voltage threshold and a second voltage threshold generated from the local reference voltage to generate an audio enable signal enabling the speaker unit to play the audio signal when the control voltage is between the first voltage threshold and the second voltage threshold, wherein the main unit receives feedback from each passive unit.

2. The speaker system according to claim 1, wherein the voltage regulation unit comprises at least one resistor.

3. The speaker system according to claim 1, wherein each passive unit is configured to generate the first voltage threshold and/or the second voltage threshold by voltage division with a voltage divider.

4. The speaker system according to claim 1, wherein the comparator unit comprises at least two comparators, wherein a first comparator is configured to compare the first voltage threshold with the control voltage and a second comparator is configured to compare the second voltage threshold with the control voltage, wherein the first comparator generates a first comparator digital output and the second comparator generates a second comparator digital output, wherein the first comparator digital output and the second comparator digital output are inputs to a logic gate, and wherein the logic gate is configured to output the audio enable signal depending on the inputs.

5. The speaker system according to claim 1, further comprising a supply signal connection and/or a ground signal connection.

6. The speaker system according to claim 1, wherein the main unit and the plurality of passive units are connected by at least five conductors configured to provide at least the supply signal connection, the ground signal connection, the reference signal connection, the audio signal connection and the control signal connection.

7. The speaker system according to claim 1, wherein the main unit and the plurality of passive units are connected by eight conductors, and wherein the eight conductors are comprised in an ethernet cable.

8. A method of testing a speaker system comprising a main unit and plurality of passive units, wherein the main unit and plurality of passive units are connected by at least a control voltage signal connection, a reference voltage signal connection and an audio signal connection to form a daisy chain, the method comprising:

generating a reference voltage on the reference voltage signal connection, wherein the reference voltage gradually increases or decreases between subsequent passive units along the daisy chain, thereby providing a local reference voltage to each passive unit;

providing a control voltage on the control voltage signal connection;

generating an audio signal to the plurality of passive units through the audio signal connection;

in each passive unit, comparing the control voltage to a first voltage threshold and a second voltage threshold generated from the local reference voltage to generate an audio enable signal enabling a speaker unit in the passive unit to play the audio signal when the control voltage is between the first voltage threshold and the second voltage threshold;

receiving a feedback from each passive unit, thereby testing each passive unit.

9. The method according to claim 8, wherein the feedback is received by the main unit.

10. The method according to claim 9, wherein the feedback is a feedback current.

11. The method according to claim 8, wherein the feedback current is a spike current provoked by an activation of the speaker unit.

12. The method according to claim 8, wherein the main unit and/or at least one of the plurality of passive units comprise at least one microphone.

13. The method according to claim 12, wherein the feedback is an audio feedback, wherein the audio feedback is the audio signal played by the passive unit and recorded by the at least one microphone.

14. The method according to claim 8, wherein the method further comprises sweeping the control voltage on the control voltage signal connection from a first voltage level to a second voltage level.

15. A method of testing a speaker system comprising a main unit and plurality of passive units, wherein the main unit and plurality of passive units are connected by at least a control voltage signal connection, a reference voltage signal connection and an audio signal connection to form a daisy chain, the speaker system being configured for testing the plurality of passive units individually, wherein the main unit and plurality of passive units are connected by at least a control voltage signal connection, a reference voltage signal connection and an audio signal connection to form a daisy chain, the main unit being configured to generate:

a control voltage to the plurality of passive units through the control voltage signal connection;

a reference voltage to the plurality of passive units through the reference voltage signal connection; and an audio signal to the plurality of passive units through the audio signal connection, the speaker system further comprising a voltage regulation unit between each of the plurality of passive units on the reference voltage signal connection, wherein each voltage regulation unit is adapted to provide a local reference voltage to each passive unit, wherein the local reference voltages to the plurality of passive units gradually increase or decrease between subsequent passive units along the daisy chain, each of the plurality of passive unit comprising:

a speaker unit;

a comparator unit configured to compare the control voltage to a first voltage threshold and a second voltage threshold generated from the local reference voltage to generate an audio enable signal enabling the speaker unit to play the audio signal when the control voltage is between the first voltage threshold and the second voltage threshold, wherein the main unit receives feedback from each passive unit;

the method comprising:

generating a reference voltage on the reference voltage signal connection, wherein the reference voltage gradually increases or decreases between subsequent passive units along the daisy chain, thereby providing a local reference voltage to each passive unit;

providing a control voltage on the control voltage signal connection;

generating an audio signal to the plurality of passive units through the audio signal connection;

in each passive unit, comparing the control voltage to a first voltage threshold and a second voltage threshold generated from the local reference voltage to generate an audio enable signal enabling a speaker unit in the passive unit to play the audio signal when the control voltage is between the first voltage threshold and the second voltage threshold;

receiving a feedback from each passive unit, thereby testing each passive unit.

* * * * *